United States Patent
Chepuri et al.

(10) Patent No.: US 8,438,277 B1
(45) Date of Patent: May 7, 2013

(54) SYSTEMS AND METHODS FOR PREVENTING DATA INCONSISTENCY WITHIN COMPUTER CLUSTERS

(75) Inventors: Rajesh Chepuri, Maharashtra (IN); Shailesh Marathe, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 350 days.

(21) Appl. No.: 12/962,855

(22) Filed: Dec. 8, 2010

(51) Int. Cl.
*G06F 15/173* (2006.01)

(52) U.S. Cl.
USPC ........... 709/224; 709/217; 709/218; 709/219; 707/640

(58) Field of Classification Search .................. None
See application file for complete search history.

(56) References Cited

U.S. PATENT DOCUMENTS

| | | | |
|---|---|---|---|
| 7,464,378 B1 * | 12/2008 | Limaye et al. | 718/100 |
| 2002/0095470 A1 * | 7/2002 | Cochran et al. | 709/208 |
| 2005/0033778 A1 * | 2/2005 | Price | 707/202 |
| 2008/0072105 A1 * | 3/2008 | Fujibayashi | 714/47 |
| 2012/0110185 A1 * | 5/2012 | Ganesan et al. | 709/226 |

* cited by examiner

*Primary Examiner* — Liangche A Wang
*Assistant Examiner* — Hao Nguyen
(74) *Attorney, Agent, or Firm* — ALG Intellectual Property, LLC (57) ABSTRACT

A computer-implemented method for preventing data inconsistency within computer clusters may include (1) identifying a computer cluster includes (a) a plurality of nodes located at a plurality of sites, (b) a plurality of storage devices that store mirrored data at the sites, (c) at least one network communication link that enables nodes located at different sites to communicate with one another, and (d) at least one storage communication link that enables nodes to communicate with storage devices located at different sites, (2) detecting a communication failure that prevents communication via the storage communication link without preventing communication via the network communication link, (3) identifying a preference order that ranks the sites within the computer cluster by preference, and then (4) satisfying detach requests initiated by nodes within the computer cluster in the order specified by the preference order. Various other systems, methods, and computer-readable media are also disclosed.

14 Claims, 6 Drawing Sheets

SYSTEMS AND METHODS FOR PREVENTING DATA INCONSISTENCY WITHIN COMPUTER CLUSTERS

BACKGROUND

Computer clusters typically include multiple nodes that collectively perform one or more computing tasks. In a disaster-recovery solution, a computer cluster (such as a campus cluster) may include multiple mirrored volumes located at different sites. By maintaining multiple mirrored volumes at different sites, the computer cluster may prevent or mitigate data loss in the event of a disaster or system failure.

Many computer-cluster configurations include separate inter-site communication links for network and storage traffic for cost and convenience reasons. In such configurations, a computer cluster may experience a communication failure that severs the inter-site storage-communication link but leaves the inter-site network-communication link intact. Unfortunately, if a communication link that enables nodes to communicate with mirrored volumes located at different sites fails or becomes disconnected, the nodes within the cluster may experience I/O errors upon attempting to access mirrored volumes located at different sites. Such I/O errors may lead to application unavailability and/or data inconsistency within the computer cluster.

In an attempt to avoid such computing difficulties, traditional storage management software installed on the computer cluster may detach all mirrored volumes located at the site where the first I/O error was detected. However, since the first I/O error may be detected at any site within the computer cluster, users are generally unable to accurately predict the site(s) at which the traditional storage management software will ultimately detach the mirrored volume(s) in the event of a disaster or system failure. As such, the instant disclosure identifies a need for systems and methods for preventing application unavailability and data inconsistency within computer clusters in an effective, predictable manner.

SUMMARY

As will be described in greater detail below, the instant disclosure generally relates to systems and methods for preventing data inconsistency within a computer cluster (such as a campus cluster) that includes (1) a plurality of nodes located at a plurality of sites, (2) a plurality of storage devices that store mirrored data at the sites, (3) at least one network communication link that enables nodes located at different sites to communicate with one another, and (4) at least one storage communication link that enables nodes to communicate with storage devices located at different sites. In one example, storage management software may prevent data inconsistency within such a cluster due to storage-communication-link failures by (1) detecting a communication failure that prevents communication via the storage communication link without preventing communication via the network communication link, (2) identifying a preference order (such as a user-specified or rule-based preference order) that ranks the sites within the computer cluster by preference, and then (3) satisfying detach requests initiated by nodes within the computer cluster in the order specified by the preference order.

In some examples, each detach request may represent a request initiated by a node to detach at least one storage device located at a different site than the node. For example, the storage management software may identify at least one detach request initiated by a node to detach at least one storage device located at a different site than the node. In this example, the storage management software may determine whether the preference order ranks the site where the node is located higher or lower than the site where the storage device is located.

In one embodiment, if the preference order ranks the site where the node is located higher than the site where the storage device is located, then the storage management software may satisfy the detach request by detaching the storage device from the computer cluster. In another embodiment, if the preference order ranks the site where the node is located lower than the site where the storage device is located, then the storage management software may deny the detach request. In addition to simply ranking the sites within the computer cluster, the preference order may also rank each site on a per-application basis, based at least in part on the amount of I/O activity associated with the site, and/or based at least in part on whether a particular application is currently running at the site.

In some examples, prior to satisfying any detach requests, the storage management software may detect (and/or confirm) the communication failure by identifying a plurality of detach requests initiated by nodes located at different sites. For example, two nodes located at two different sites may each attempt to access at least one storage device located at the opposing site. In this example, upon failing to successfully access at least one storage device located at the opposing site, each node may initiate a detach request in an attempt to avoid application unavailability and prevent inconsistent data from being stored within the computer cluster as a result of the communication failure.

As such, by identifying a plurality of detach requests initiated by nodes located at different sites (such as opposing sites), the storage management software may determine that the storage communication link has failed or become disconnected. In other examples, if a node located at a site affected by the communication failure does not initiate a detach request, the storage management software may check the connectivity status of the node to ensure that the node is unable to communicate with at least one storage device located at the other site.

In addition, as will be explained in greater detail below, by satisfying detach requests in the order specified by a preference order, the various systems and methods described herein may enable users to specify and control the site(s) at which the storage management software may detach one or more storage devices in the event of a communication failure that prevents communication via the storage communication link.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for preventing data inconsistency within computer clusters. The following will provide, with reference to FIGS. 1-2, detailed descriptions of exemplary systems for preventing data inconsistency within computer clusters. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

Figure 1:
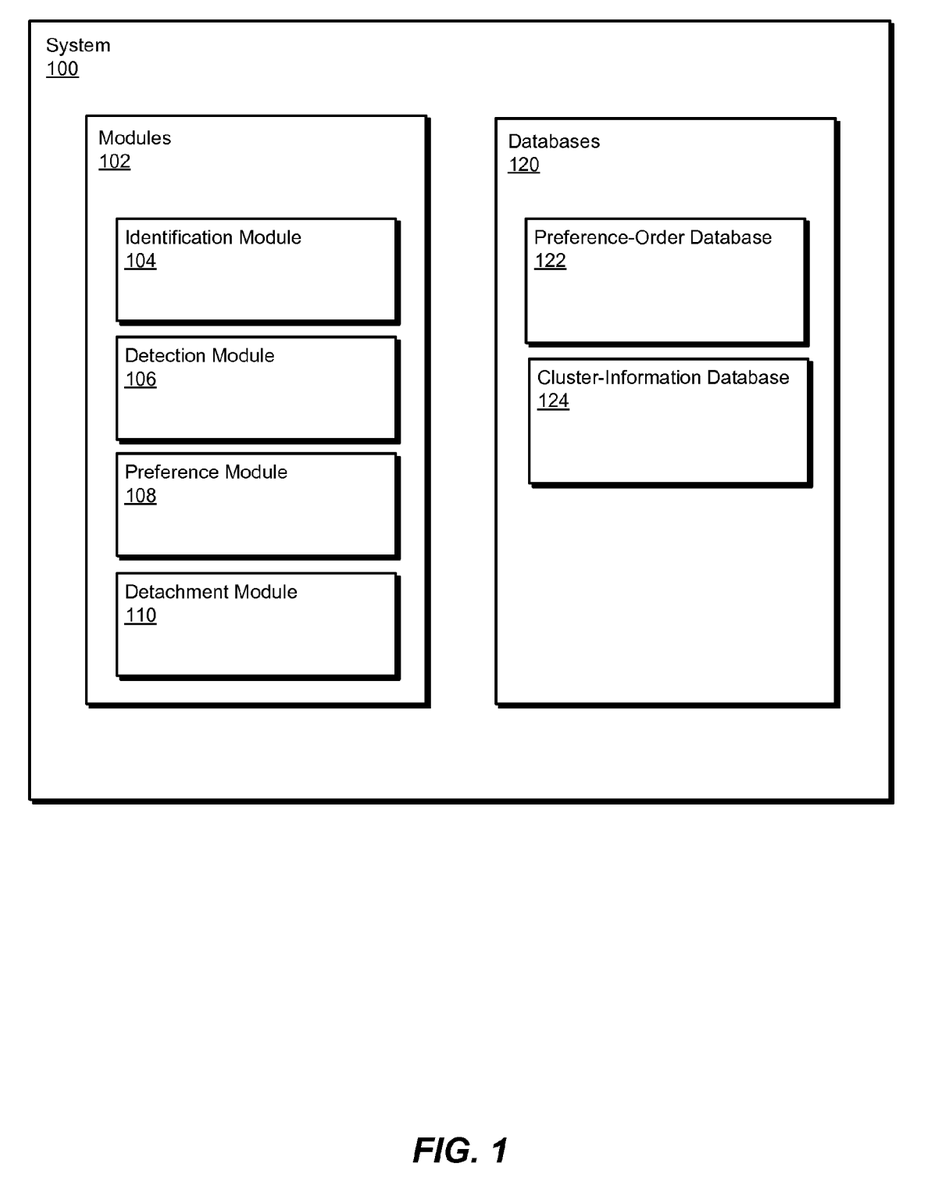
FIG. 1 is a block diagram of an exemplary system for preventing data inconsistency within computer clusters.

FIG. 1 is a block diagram of an exemplary system 100 for preventing data inconsistency within computer clusters. As illustrated in this figure, exemplary system 100 may include one or more modules 102 for performing one or more tasks. For example, and as will be explained in greater detail below, exemplary system 100 may include an identification module 104 programmed to identify a computer cluster (such as a campus cluster) that includes (a) a plurality of nodes located at a plurality of sites, (b) a plurality of storage devices that store mirrored data at the sites, (c) at least one network communication link that enables nodes located at different sites to communicate with one another, and (d) at least one storage communication link that enables nodes to communicate with storage devices located at different sites.

In addition, as will be described in greater detail below, exemplary system 100 may include a detection module 106 programmed to detect a communication failure that prevents communication via the storage communication link without preventing communication via the network communication link. Exemplary system 100 may also include a preference module 108 programmed to identify a preference order that ranks the sites within the computer cluster by preference. Exemplary system 100 may further include a detachment module 110 programmed to satisfy detach requests initiated by nodes within the computer cluster in the order specified by the preference order. Although illustrated as separate elements, one or more of modules 102 in FIG. 1 may represent portions of a single module or application (e.g., storage management software installed on a computer cluster).

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., nodes 206(1)-(N)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a preference-order database 122 that stores a preference order (such as a user-specified or rule-based preference order) that ranks sites (such as sites 202(1)-(N) in FIG. 2) within a computer cluster by preference. In addition, preference-order database 122 may be part of one or more applications (e.g., VERITAS CLUSTER VOLUME MANAGER and/or VERITAS CLUSTER SERVER) installed on the campus cluster.

In at least one embodiment, exemplary system 100 may also include a cluster-information database 124 that stores information about each device configured to be part of a computer cluster. In particular, cluster-information database 124 may include information that identifies each node and/or storage device within a computer cluster. Examples of such information include, without limitation, a physical or virtual location, an identification address (e.g., an IP address or a MAC address), a registration key, or any other suitable identifier. Similar to preference-order database 122, cluster-information database 124 may also be part of one or more applications (e.g., VERITAS CLUSTER VOLUME MANAGER and/or VERITAS CLUSTER SERVER) installed on the campus cluster.

Databases 120 in FIG. 1 may represent a portion of one or more computing devices. For example, databases 120 may represent a portion of one or more of nodes 206(1)-(N) in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as any of nodes 206(1)-(N) in FIG. 2, computing system 510 in FIG. 5, and/or portions of exemplary network architecture 600 in FIG. 6.

Figure 2:
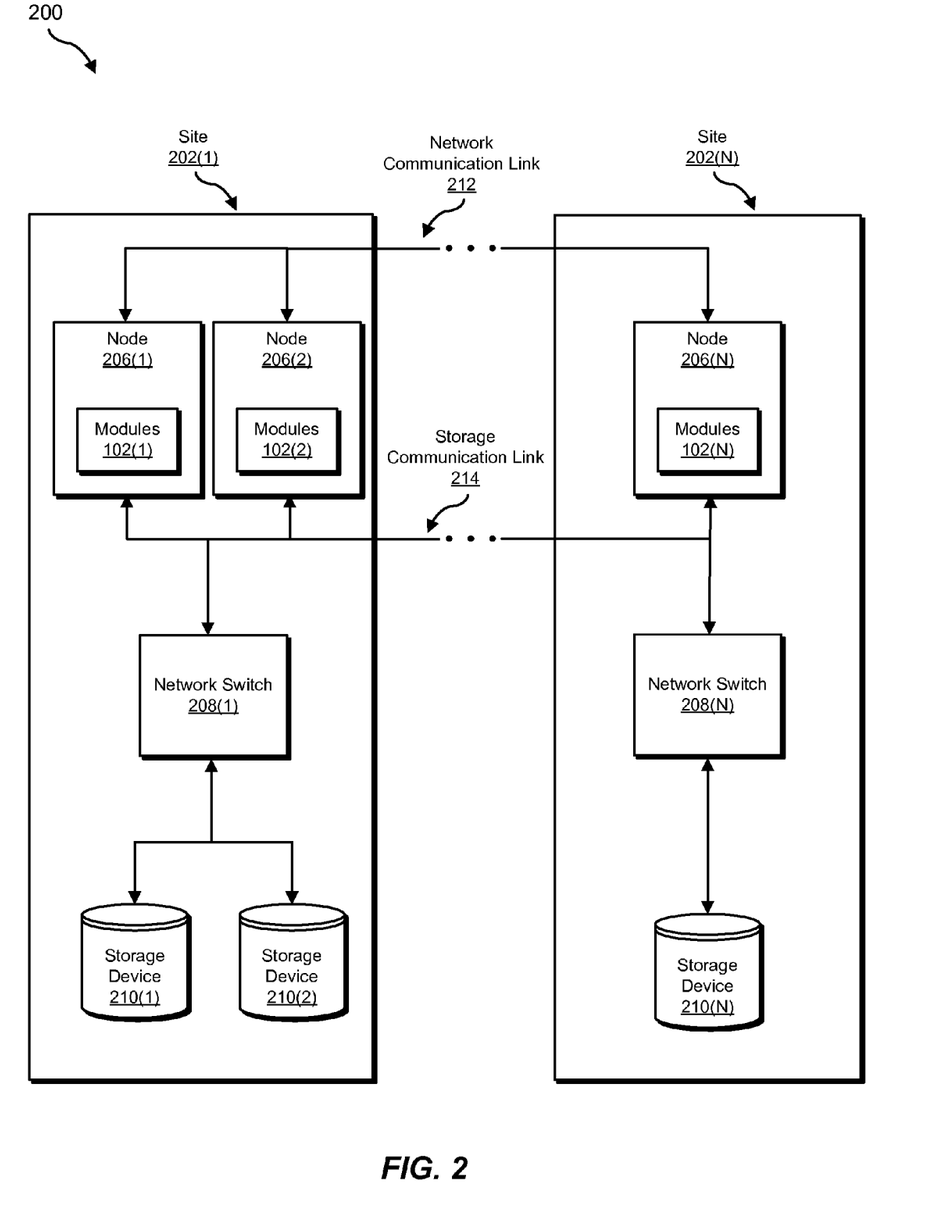
FIG. 2 is a block diagram of an exemplary system for preventing data inconsistency within computer clusters.

Exemplary system 100 in FIG. 1 may be deployed in a variety of ways. For example, all or a portion of exemplary system 100 may represent portions of exemplary computer cluster 200 in FIG. 2. As shown in FIG. 2, cluster 200 may include a plurality of nodes 206(1)-(N) located at a plurality of sites 202(1)-(N). In one example, nodes 206(1)-(N) may communicate with nodes located at other sites via network communication link 212 (e.g., node 206(1) at site 202(1) may communicate with node 206(N) at site 202(N) via network communication link 212). Similarly, nodes 206(1)-(N) may communicate with storage devices located at other sites via storage communication link 214 (e.g., node 206(1) at site 202(1) may communicate with storage device 210(N) at site 202(N) via storage communication link 214).

In one embodiment, and as will be described in greater detail below, modules 102 from FIG. 1 may prevent data inconsistency within computer cluster 200 due to storage-communication-link failures by programming one or more of nodes 206(1)-(N) to (1) detect a communication failure that prevents communication via storage communication link 214 without preventing communication via network communication link 212, (2) identify a preference order that ranks sites 202(1)-(N) within the computer cluster by preference, and then (3) satisfy detach requests initiated by nodes 206(1)-(N) within the computer cluster in the order specified by the preference order.

Nodes 206(1)-(N) generally represent any type or form of computing device within a computer cluster that is capable of reading computer-executable instructions and communicating with other computing devices and/or storage devices. Nodes 206(1)-(N) may be programmed to individually and/or collectively perform tasks by coordinating operations with one another within the computer cluster. Examples of nodes 206(1)-(N) include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Storage devices 210(1)-(N) generally represent any type or form of physical storage device or virtual storage environment capable of communicating with nodes 206(1)-(N) via network switches 208(1)-(N). For example, storage devices 210(1)-(N) in FIG. 2 may represent storage arrays that communicate with nodes 206(1)-(N) via network switches 208(1)-(N) and store mirrored data (i.e., substantially similar or identical data) within the computer cluster. Examples of storage devices 210(1)-(N) include, without limitation, storage arrays, disk arrays, disk array controllers, mirrored volumes, computing devices, application servers, database servers, or any other suitable storage devices.

Network switches 208(1)-(N) generally represent any intermediary device that facilitates communication between at least one node and at least one storage device within a computer cluster. For example, network switch 208(1) in FIG. 2 may enable nodes 206(1)-(N) to communicate with storage devices 210(1)-(2). Examples of network switches 208(1)-(N) include, without limitation, fibre channel switches, network bridges, multilayer switches, network hubs, signal repeaters, packet switches, routers, or any other suitable networks switches.

Network communication link 212 and storage communication link 214 generally represent any type or form of communication medium capable of facilitating communication between two or more of the devices illustrated in FIG. 2. Examples of network communication link 212 and storage communication link 214 include, without limitation, fibre channels, Ethernet cables, optical fibers, or any other suitable communication media.

Although not illustrated in FIG. 2, storage communication link 214 may include separate communication lines that facilitate communication between nodes 206(1)-(N) and storage devices 210(1)-(N) via network switches 208(1)-(N). For example, one communication line may facilitate communication between nodes 206(1)-(2) to switch 208(N), and another communication line may facilitate communication between node 206(N) and switch 208(1). In this example, both communication lines may be enclosed in the same physical housing or structure.

Although not illustrated in FIG. 2, computer cluster 200 may include one or more networks (or architectures) capable of facilitating communication or data transfer in addition to or as part of network communication link 212 or storage communication link 214. Examples of such networks include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Such networks may facilitate communication or data transfer using wireless or wired connections.

Figure 3:
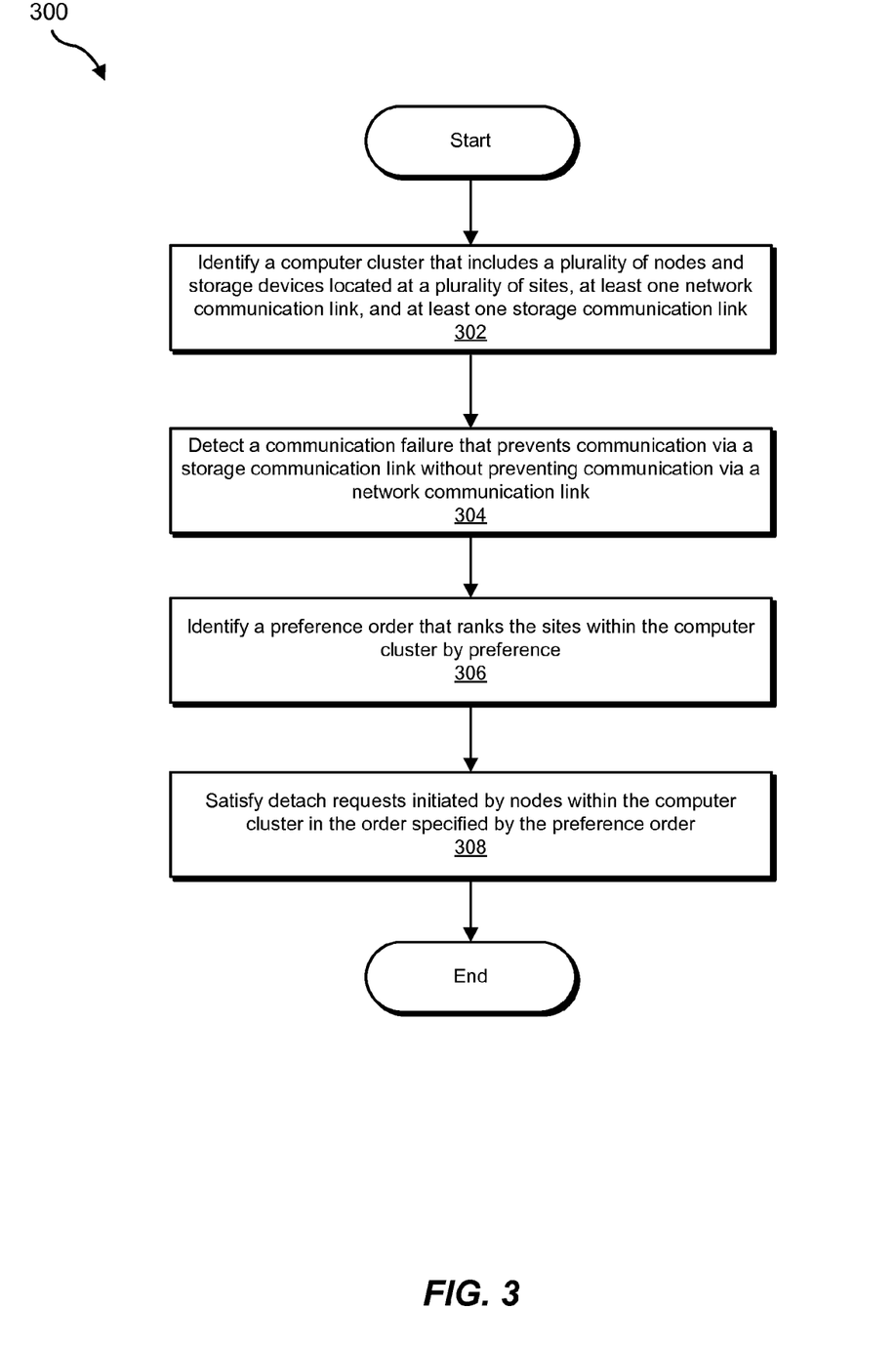
FIG. 3 is a flow diagram of an exemplary method for preventing data inconsistency within computer clusters.

FIG. 3 is a flow diagram of an exemplary computer-implemented method 300 for preventing data inconsistency within computer clusters due to storage-communication-link failures. The steps shown in FIG. 3 may be performed by any suitable computer-executable code and/or computing system. In some embodiments, the steps shown in FIG. 3 may be performed by one or more of the components of system 100 in FIG. 1, cluster 200 in FIG. 2, computing system 510 in FIG. 5, and/or portions of exemplary network architecture 600 in FIG. 6.

As illustrated in FIG. 3, at step 302 the various systems described herein may identify a computer cluster. For example, identification module 104 may, as part of one or more of nodes 206(1)-(N) in FIG. 2, identify a computer cluster that includes nodes 206(1)-(N) and storage devices 210(1)-(N) located at sites 202(1)-(N). In this example, the computer cluster identified by identification module 104 may also include network switches 208(1)-(N) located at sites 202(1)-(N). In addition, the computer cluster identified by identification module 104 may be configured to collectively provide high availability to one or more applications and/or stored data.

The phrase "computer cluster," as used herein, may refer to a group of two or more nodes (e.g., nodes 206(1)-(N)) that are capable of communicating with one another in order to collectively perform one or more tasks, such as providing access to various services (such as applications or databases). Computer clusters may also incorporate one or more shared resources (such as storage devices 210(1)-(N)) that stored mirrored data at multiple sites (such as sites 202(1)-(N)). Examples of computer clusters include, without limitation, high-availability clusters, load-balancing clusters, Beowolf clusters, high-performance computing clusters, or any other suitable computer clusters.

The systems described herein may perform step 302 in a variety of ways. In one example, identification module 104 may identify one or more of nodes 206(1)-(N), storage devices 210(1)-(N), or network switches 208(1)-(N) upon construction or configuration of cluster 200. In this example, cluster-information database 124 may contain information that identifies nodes 206(1)-(N), storage devices 210(1)-(N), and/or network switches 208(1)-(N) by an identification address (such as an IP address or a MAC address), a physical or virtual location, and/or a node registration key. In another example, identification module 104 may identify one or more of nodes 206(1)-(N), storage devices 210(1)-(N), or network switches 208(1)-(N) upon receiving messages from such devices prior to detecting a communication failure.

In some embodiments, the computer cluster identified by identification module 104 in step 302 may also include a network communication link that facilitates communication among nodes located at different sites. For example, as illustrated in FIG. 2, network communication link 212 may enable nodes 206(1)-(2) located at site 202(1) to communicate with node 206(N) located at site 202(N).

In addition, the computer cluster identified by identification module 302 in step 302 may include a storage communication link 214 that facilitates communication between at least one node located at one site and at least one storage device located at a different site. For example, as illustrated in FIG. 2, storage communication link 214 may enable nodes 206(1)-(2) located at site 202(1) to communicate with storage device 210(N) located at site 202(N). In this example, storage communication link 214 may also enable node 206(N)

located at site 202(N) to communicate with storage devices 210(1)-(2) located at site 202(1).

Returning to FIG. 3, at step 304 the various systems described herein may detect a communication failure that prevents communication via the storage communication link without preventing communication via the network communication link. For example, detection module 106 may, as part of one or more of nodes 206(1)-(N) in FIG. 2, detect a communication failure that prevents communication via storage communication link 214 without preventing communication via network communication link 212. In this example, nodes 206(1)-(N) may continue to communicate with one another via network communication link 212 after the failure of storage communication link 214 has occurred. However, after the failure of storage communication link 214 has occurred, nodes 206(1)-(2) located at site 202(1) may be unable to directly communicate with storage device 210(N) located at site 202(N), and node 206(N) located at site 202(N) may be unable to directly communicate with storage devices 210(1)-(2) located at site 202(1).

The systems described herein may perform step 304 in a variety of ways. In one example, detection module 106 may identify multiple detach requests initiated by nodes located at different sites, indicating that a communication failure has occurred within the computer cluster. For example, detection module 106 may identify a detach request initiated by node 206(1) located at site 202(1) to detach storage device 210(N) located at site 202(N). In this example, detection module 106 may also identify a detach request initiated by node 206(N) located at site 202(N) to detach storage devices 210(1)-(2) located at site 202(1). As such, by identifying multiple detach requests initiated by nodes located at different sites, detection module 106 may determine that storage communication link 214 has failed or become disconnected.

In some examples, one or more nodes within the computer cluster may initiate detach requests in response to a failed attempt to access at least one storage device located at a different site. For example, node 206(1) located at site 202(1) may attempt to access storage device 210(N) located at site 202(N) via storage communication link 214. However, in this example, node 206(1)'s attempt to access storage device 210(N) may result in an I/O error. In response to the I/O error, node 206(1) may initiate a detach request to detach storage device 210(N) from the computer cluster in an attempt to avoid application unavailability and prevent inconsistent data from being stored within the computer cluster.

Figure 4:
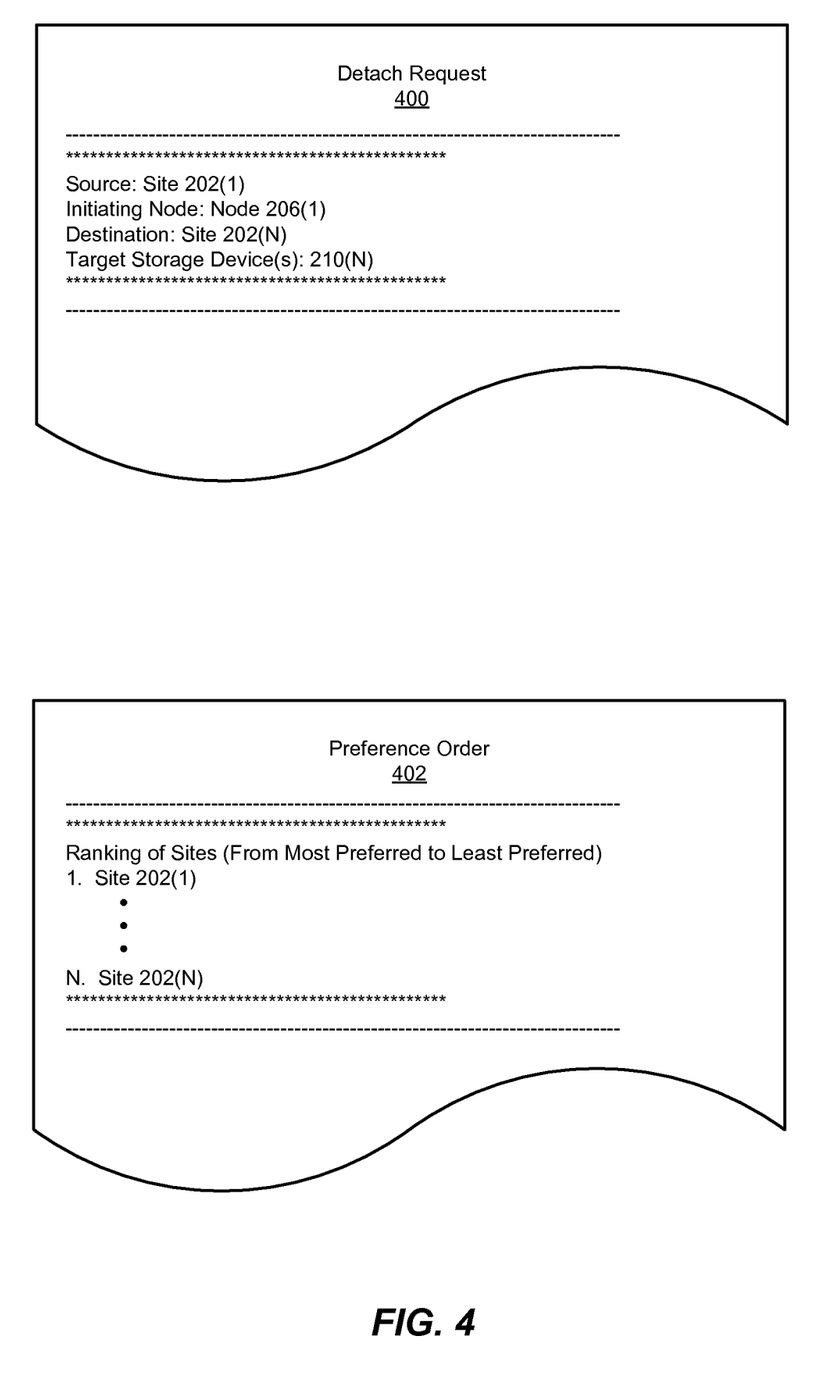
FIG. 4 is an illustration of an exemplary detach request and an exemplary preference order for satisfying such detach requests.

As illustrated in FIG. 4, a detach request 400 may include information that identifies the source site where detach request 400 was initiated (in this example, "Site 202(1)"), the node that initiated detach request 400 at the source site (in this example, "Node 206(1)"), the destination site where at least one storage device is to be detached (in this example, "Site 202(N)"), and the target storage device(s) to be detached at the destination site (in this example, "Storage device 210(N)"). In some examples, detection module 106 may identify detach request 400 and determine, based at least in part on detach request 400, that a communication failure has occurred within the computer cluster.

In certain embodiments, if a node located at a site affected by the communication failure does not initiate a detach request, detection module 106 may check the connectivity status of the node to ensure that the node is unable to communicate with at least one storage device located at the other site. For example, detection module 106 may receive detach request 400 initiated by node 206(1) to detach storage device 210(N) but not receive a detach request initiated by node 206(N) to detach storage devices 210(1)-(2). In order to confirm that a communication failure is actually preventing communication via storage communication link 214, detection module 106 may query the connectivity status of node 206(N) to ensure that node 206(N) is unable to communicate with storage devices 210(1)-(2).

As such, by checking the connectivity status of node 206(N), detection module 106 may ensure that node 206(N) failed to initiate a detach request as a result of being disconnected from the computer cluster. For example, if node 206(N) is still able to communicate with storage devices 210(1)-(2) via storage communication link 214, then detach request 400 may have been initiated by node 206(1) in response to an I/O error that did not result from a communication failure that prevents communication via storage communication link 214.

Returning to FIG. 3, at step 306 the various systems described herein may identify a preference order that ranks the sites within the computer cluster by preference. For example, preference module 108 may, as part of one or more of nodes 206(1)-(N) in FIG. 2, identify a preference order that ranks sites 202(1)-(N) within the computer cluster by preference. In this example, the preference order may rank site 202(1) higher than site 202(N) (i.e., site 202(1) is preferred over site 202(N)).

The systems described herein may perform step 306 in a variety of ways. In one example, preference module 108 may identify a rule-based preference order in preference-order database 122 located on at least one device illustrated in FIG. 2 (e.g., at least one of nodes 206(1)-(N) and/or storage devices 210(1)-(N)). In this example, this rule-based preference order may vary the ranking of sites based at least in part on one or more rules or conditions. Examples of such rules include, without limitation, whether a particular application is running on the computer cluster, whether the application is running at a particular site within the computer cluster, whether the amount of (current or historical) I/O activity detected at a particular site exceeds a predetermined threshold or exceeds the amount of I/O activity detected at a different site, or any other suitable rules or conditions for determining the ranking of sites.

In another example, preference module 108 may obtain a user-specified preference order from a configuration file or directly from a user (such as an administrator) via a user interface configured to enable the user to specify the preference order. In some embodiments, a user-specified preference order may (as with a rule-based preference order) vary the ranking of sites based at least in part on one or more rules or conditions. Examples of such rules include, without limitation, any of those described above in connection with the rule-based preference order.

As further illustrated in FIG. 4, exemplary preference order 402 may include information that identifies the ranking of sites from most preferred to least preferred. For example, preference order 402 indicates that site 202(1) is preferred over site 202(N) within the computer cluster. More specifically, preference order 402 identifies site 202(1) as the most preferred site and site 202(N) as the least preferred site within the computer cluster.

Returning to FIG. 3, at step 308 the various systems described herein may satisfy detach requests initiated by nodes within the computer cluster in the order specified by the preference order. Each detach request may be a request initiated by a node to detach at least one storage device located at a different site than the node. For example, detachment module 110 may, as part of one or more of nodes 206(1)-(N), satisfy each detach request initiated by a node located at a site ranked higher by preference order 402 than a different site where at least one storage device targeted by the detach request is located.

The systems described herein may perform step 308 in a variety of ways. In one example, detachment module 110 may identify a detach request (such as detach request 400 in FIG. 4) initiated by node 206(1) located at site 202(1) to detach storage device 210(N) located at site 202(N). In this example, detachment module 110 may then determine that preference order 402 ranks site 202(1) where node 206(1) is located higher than site 202(N) where storage device 210(N) is located. Upon determining that preference order 402 ranks site 202(1) higher than site 202(N), detachment module 110 may satisfy detach request 400 by detaching storage device 210(N) from the computer cluster.

In another example, detachment module 110 may identify an additional detach request initiated by node 206(N) located at site 202(N) to detach storage devices 210(1)-(2) located at site 202(1). In this example, detachment module 110 may then determine that the preference order ranks site 202(N) where node 206(N) is located lower than site 202(1) where storage devices 210(1)-(2) are located. Upon determining that the preference order ranks site 202(N) lower than site 202(1), detachment module 110 may deny the additional detach. Upon completion of step 308, exemplary method 300 in FIG. 3 may terminate.

As explained above, by satisfying detach requests in the order specified by a preference order, the various systems and methods described herein may enable users to specify and control the site(s) at which the storage management software may detach one or more storage devices in the event of a communication failure that prevents communication via the storage communication link.

Figure 5:
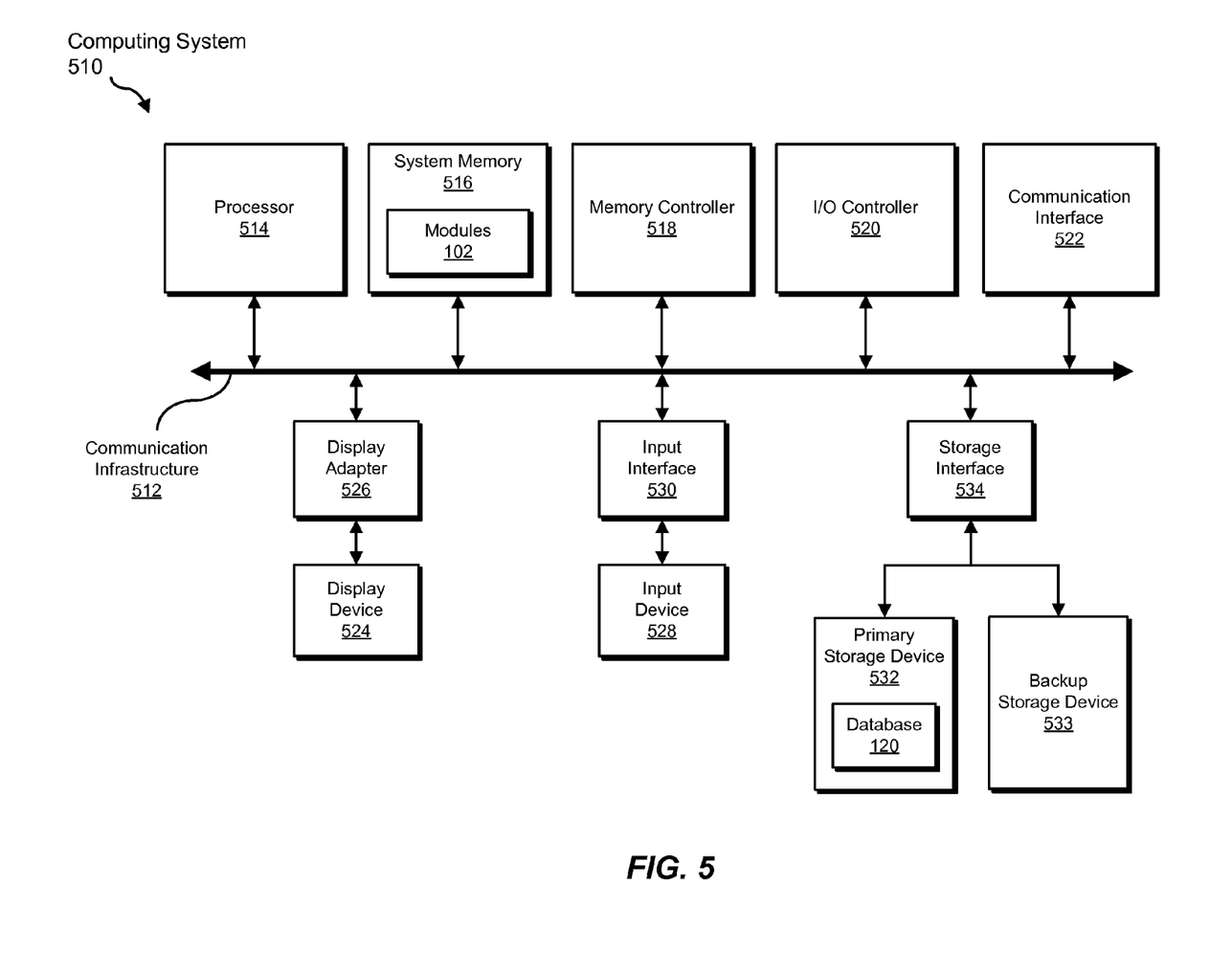
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, detecting, satisfying, detaching, determining, checking, and denying steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, detecting, satisfying, detaching, determining, checking, and denying.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, detecting, satisfying, detaching, determining, checking, and denying steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, detecting, satisfying, detaching, determining, checking, and denying steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, detecting, satisfying, detaching, determining, checking, and denying steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, detecting, satisfying, detaching, determining, checking, and denying steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
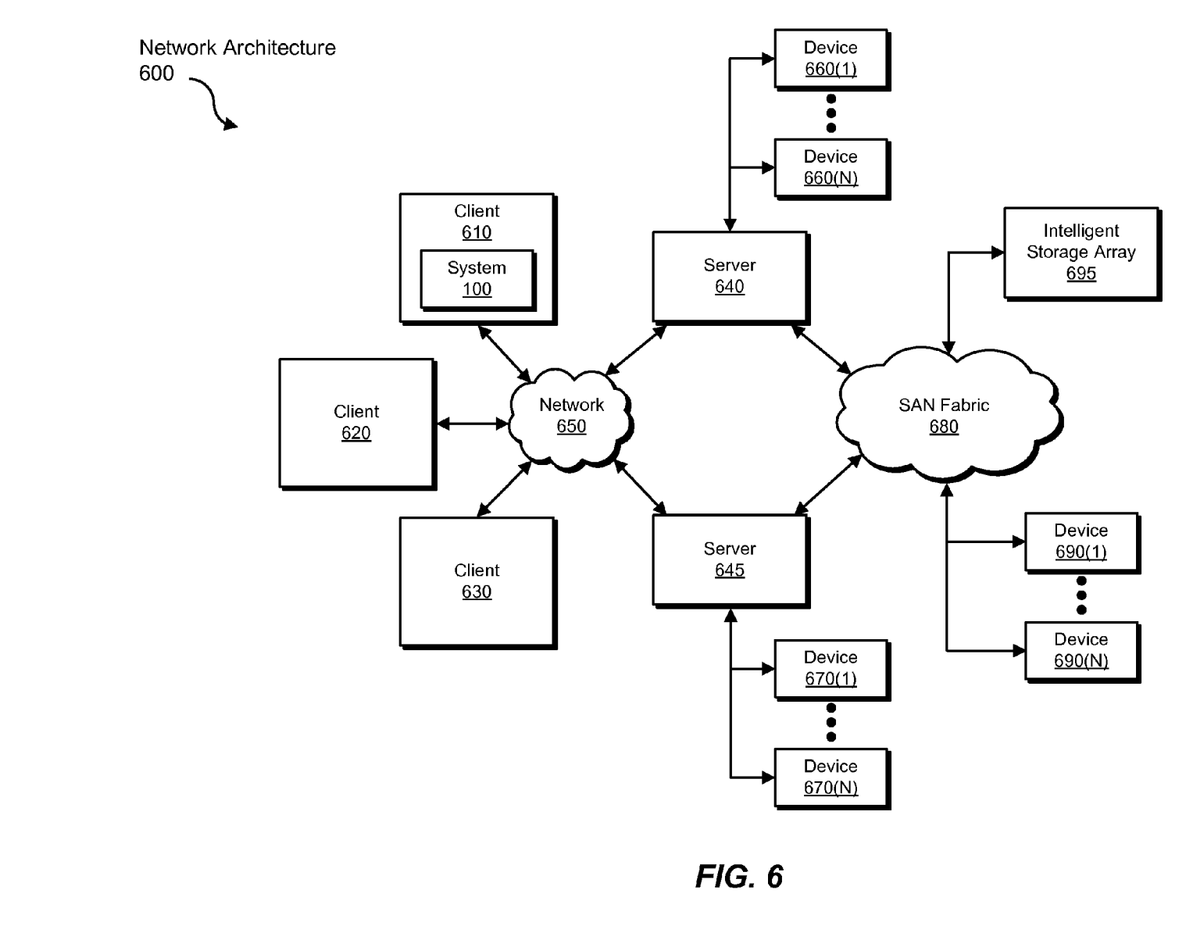
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, detecting, satisfying, detaching, determining, checking, and denying steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for preventing data inconsistency within computer clusters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a characteristic or property of a physical device (such as a storage device) by detaching the same from a computer cluster in response to a detach request.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented for preventing data inconsistency within computer clusters, at least a portion of the method being performed by at least one node comprising at least one processor, the method comprising:
identifying a computer cluster that comprises:
a plurality of nodes located at a plurality of sites;
a plurality of storage devices that store mirrored data at the sites;
at least one network communication link that enables nodes located at different sites to communicate with one another;
at least one storage communication link that enables nodes to communicate with storage devices located at different sites;
detecting a communication failure that prevents communication via the storage communication link without preventing communication via the network communication link;
identifying a preference order that ranks the sites within the computer cluster by preference;
satisfying detach requests initiated by nodes within the computer cluster in the order specified by the preference order, wherein each detach request comprises a request initiated by a node to detach at least one storage device located at a different site than the node in order to prevent inconsistent data from being stored within the computer cluster as a result of the communication failure;
wherein satisfying detach requests in the order specified by the preference order comprises for each detach request:
determining whether the preference order ranks the site where the node is located lower than the site where the storage device is located;
denying the detach request when the preference order ranks the site where the node is located lower than the site where the storage device is located and satisfying the detach request by detaching the storage device from the computer cluster when the preference order ranks the site where the node is located higher than the site where the storage device is located.

2. The computer-implemented method of claim 1, wherein detecting the communication failure that prevents communication via the storage communication link comprises identifying a plurality of detach requests initiated by nodes located at different sites, wherein each detach request is initiated in response to a failed attempt by a node to access at least one storage device located at a different site than the node.

3. The computer-implemented method of claim 1, wherein detecting the communication failure that prevents communication via the storage communication link comprises:
determining that at least one node located at a site affected by the communication failure failed to initiate a detach request;
checking the connectivity status of the node located at the site affected by the communication failure in order to ensure that the node failed to initiate a detach request as a result of being disconnected from the computer cluster.

4. The computer-implemented method of claim 1, wherein identifying the preference order that ranks the sites within the computer cluster by preference comprises at least one of:
identifying a user-specified preference order;
identifying a rule-based preference order.

5. The computer-implemented method of claim 1, wherein the preference order ranks each site within the computer cluster:
on a per-application basis;
based at least in part on the amount of I/O activity associated with the site; or
based at least in part on whether a particular application is currently running at the site.

6. A system for preventing data inconsistency within computer clusters, the system comprising:
an identification module programmed to identify a computer cluster that comprises:
a plurality of nodes located at a plurality of sites;
a plurality of storage devices that store mirrored data at the sites;
at least one network communication link that enables nodes located at different sites to communicate with one another;
at least one storage communication link that enables nodes to communicate with storage devices located at different sites;
a detection module programmed to detect a communication failure that prevents communication via the storage communication link without preventing communication via the network communication link;
a preference module programmed to identify a preference order that ranks the sites within the computer cluster by preference;
a detachment module programmed to satisfy detach requests initiated by nodes within the computer cluster in the order specified by the preference order, wherein each detach request comprises a request initiated by a node to detach at least one storage device located at a different site than the node in order to prevent inconsistent data from being stored within the computer cluster as a result of the communication failure;
wherein the detachment module satisfies detach requests in the order specified by the preference order comprises for each detach request:
determining whether the preference order ranks the site where the node is located lower than the site where the storage device is located;
denying the detach request when the preference order ranks the site where the node is located lower than the site where the storage device is located and satisfying the detach request by detaching the storage device from the computer cluster when the preference order ranks the site where the node is located higher than the site where the storage device is located;
at least one processor configured to execute the identification module, the detection module, and the detachment module.

7. The system of claim 6, wherein the detection module is further programmed to identify a plurality of detach requests initiated by nodes located at different sites, wherein each detach request is initiated in response to a failed attempt by a node to access at least one storage device located at a different site than the node.

8. The system of claim 6, wherein the detection module is further programmed to:
determine that at least one node located at a site affected by the communication failure failed to initiate a detach request;
check the connectivity status of the node located at the site affected by the communication failure in order to ensure that the node failed to initiate a detach request as a result of being disconnected from the computer cluster.

9. The system of claim 6, wherein the preference module is further programmed to:
- identify a user-specified preference order; or
- identify a rule-based preference order.

10. The system of claim 6, wherein the preference order ranks each site within the computer cluster:
- on a per-application basis;
- based at least in part on the amount of I/O activity associated with the site; or
- based at least in part on whether a particular application is currently running at the site.

11. A non-transitory computer-readable-storage medium comprising one or more computer-executable instructions that, when executed by at least one processor of a node, cause the node to:
- identify a computer cluster that comprises:
- a plurality of nodes located at a plurality of sites;
- a plurality of storage devices that store mirrored data at the sites;
- at least one network communication link that enables nodes located at different sites to communicate with one another;
- at least one storage communication link that enables nodes to communicate with storage devices located at different sites;
- detect a communication failure that prevents communication via the storage communication link without preventing communication via the network communication link;
- identify a preference order that ranks the sites within the computer cluster by preference;
- satisfy detach requests initiated by nodes within the computer cluster in the order specified by the preference order, wherein each detach request comprises a request initiated by a node to detach at least one storage device located at a different site than the node in order to prevent inconsistent data from being stored within the computer cluster as a result of the communication failure;
- wherein the one or more computer-executable instructions, when executed by the node, cause the node to satisfy detach requests in the order specified by the preference order comprises for each detach request:
- determining whether the preference order ranks the site where the node is located lower than the site where the storage device is located;
- denying the detach request when the preference order ranks the site where the node is located lower than the site where the storage device is located and satisfying the detach request by detaching the storage device from the computer cluster when the preference order ranks the site where the node is located higher than the site where the storage device is located.

12. The non-transitory computer-readable-storage medium of claim 11, wherein the one or more computer-executable instructions, when executed by the node, further cause the node to identify a plurality of detach requests initiated by nodes located at different sites, wherein each detach request is initiated in response to a failed attempt by a node to access at least one storage device located at a different site than the node.

13. The non-transitory computer-readable-storage medium of claim 11, wherein the one or more computer-executable instructions, when executed by the node, further cause the node to:
- determine that at least one node located at a site affected by the communication failure failed to initiate a detach request;
- check the connectivity status of the node located at the site affected by the communication failure in order to ensure that the node failed to initiate a detach request as a result of being disconnected from the computer cluster.

14. The non-transitory computer-readable-storage medium of claim 11, wherein the one or more computer-executable instructions, when executed by the node, further cause the node to:
- identify a user-specified preference order; or
- identify a rule-based preference order.

* * * * *